UNITED STATES PATENT OFFICE.

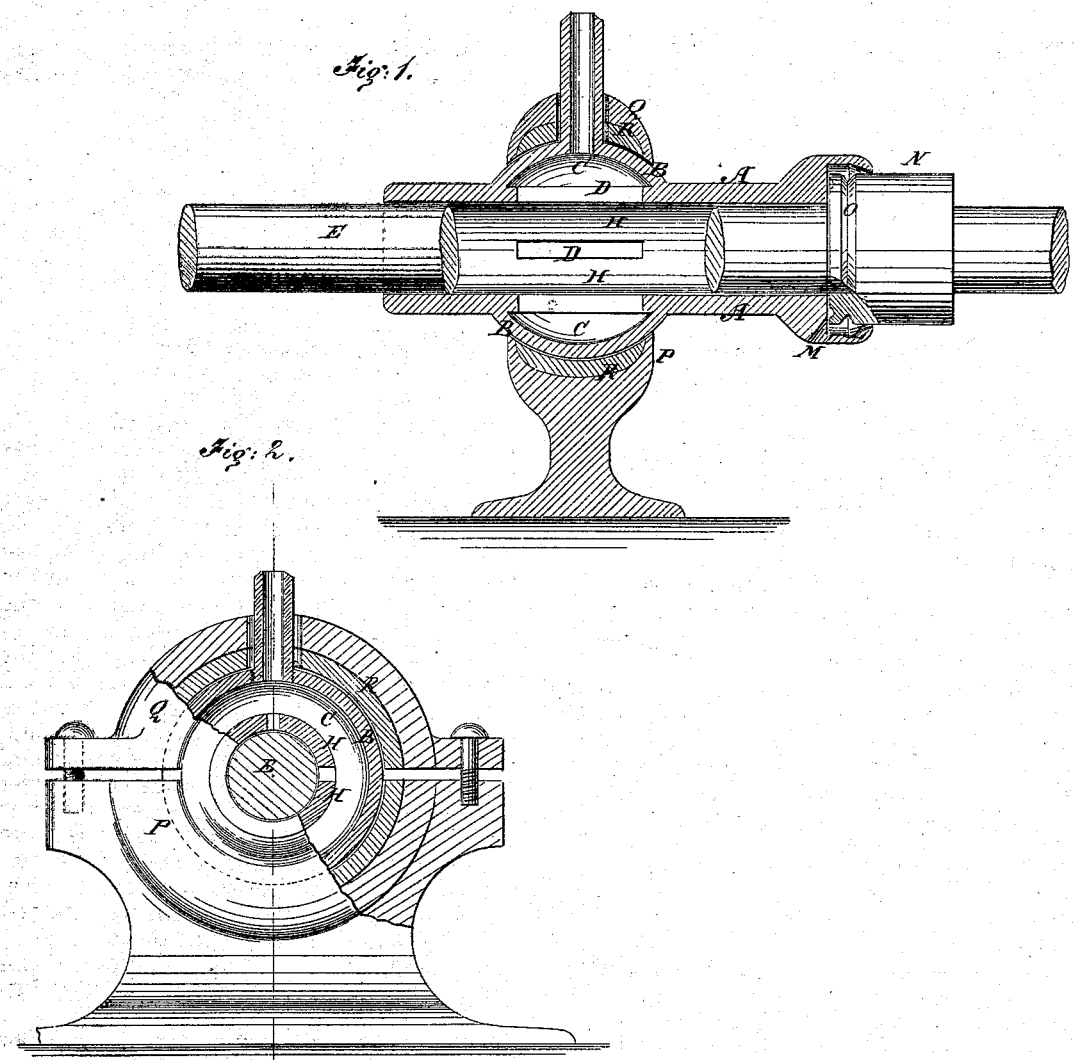

SAMUEL ALAND, OF ROME, NEW YORK.

IMPROVEMENT IN JOURNAL-BOXES.

Specification forming part of Letters Patent No. 136,198, dated February 25, 1873.

*To all whom it may concern:*

Be it known that I, SAMUEL ALAND, of of Rome, in the county of Oneida and State of New York, have invented a new and Improved Journal-Box, of which the following is a specification:

The first part of the invention consists of a tubular box with a ball at the center for being confined in a socket; also, for having a chamber for containing oil to lubricate the journal, with passages for the oil to the journal-box cast in one piece, whereby it is more durable than those composed of a tube fitted in a large hole in the shell of the box, and it can be made cheaper. The second part of the invention consists of a socket in the end of the box with a discharge-passage from the bottom adapted to receive the drip escaping from the end of the box and conducting it to a receptacle, and a groove in the face of the shaft behind the shoulder of the journal, which prevents the drip from escaping along the shaft.

Figure 1 is a longitudinal sectional elevation of my improved box and the stand and cap. Fig. 2 is partly a transverse sectional elevation and partly a side elevation.

Similar letters of reference indicate corresponding parts.

A is the tube, and B the ball, of my improved journal-box, with an oil-chamber, C, in the ball surrounding the tube, and passages D through the tube to the chamber, the tube and ball being cast together in one piece, and the oil chamber and passages formed at the same time in casting them.

L represents the socket at the end of the box to receive the drip, with a hole, M, for conducting it away to a receptacle. This socket I make larger in diameter at the inner end next to the shoulder to retain the oil, and in the face of the collar N, or hub on the shaft fitting in said socket, I make a small groove, O, to prevent the oil from working along the shaft, which it does by the natural tendency of the oil to flow to the point which is the greatest distance from the center of a revolving body, so that it remains on the part of the collar or hub between the groove and the end until it drips off into the socket. P represents the standard, and Q the cup, for supporting and holding the box. They are formed with a socket for the ball somewhat larger than the ball is, and the box is centered in it with the journal in the box, and then the space is filled by composition metal R cast in, securing the box in line with the shaft; also, so that it can oscillate if the shaft shifts and still have a fair bearing in the standard.

Having thus described my invention, I claim as new and desire to secure by Letters Patent—

1. The improved journal-box A provided with slats D, and the ball B cast or constructed in one piece and forming the chamber C between them, as shown and described.

2. The shaft having the enlarged collar N provided with the groove O, in combination with the socket L formed in the end of the journal-box A, as shown and described.

SAMUEL ALAND.

Witnesses:
CHARLES T. HAYDEN,
HENRY H. MATTESON.